Oct. 22, 1968  C. P. ROHMANN  3,406,569
MAGNETIC FLOWMETER OF IMPROVED LINEARITY
Filed July 7, 1965
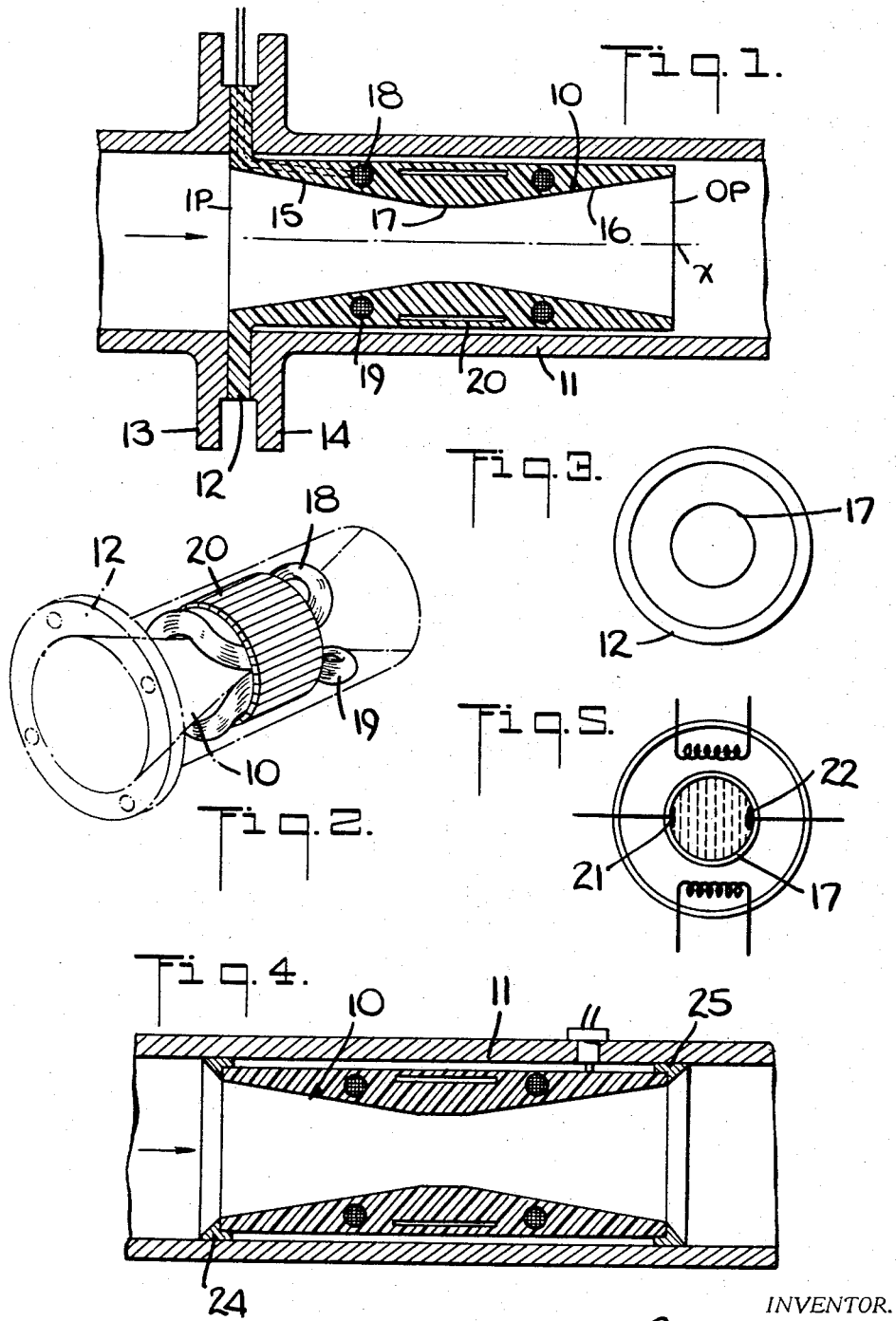
INVENTOR.
CHARLES P. ROHMANN
BY
ATTORNEY United States Patent Office 3,406,569
Patented Oct. 22, 1968

3,406,569
MAGNETIC FLOWMETER OF IMPROVED LINEARITY
Charles P. Rohmann, Hatboro, Pa., assignor to Fischer & Porter Co., Warminister, Pa., a corporation of Pennsylvania
Filed July 7, 1965, Ser. No. 469,984
6 Claims. (Cl. 73—194)

ABSTRACT OF THE DISCLOSURE

A magnetic flowmeter adapted to operate in conjunction with a pipe section through which fluid is flowable in a range of flow rate values including low flow rates below the level at which a linear response is ordinarily obtainable. The flowmeter comprises a flow tube which is insertable in the pipe section, the tube having a constricted throat section serving to increase the velocity of flow therethrough to a level producing a linear response. An electromagnet surrounds the throat section within the pipe and is sealed from the fluid to produce a magnetic field perpendicular to the flow direction, voltages induced in the fluid being picked up by electrodes secured to the throat section.

---

This invention relates generally to electromagnetic flowmeters, and more particularly to an insert type flowmeter having a substantially linear response throughout a wide range of flow rates.

The magnetic flowmeter is adapted to measure volume rates of those fluids which present difficult handling problems, such as corrosive acids, sewage, slurries, detergents, and the like. In a magnetic flowmeter, a uniformly distributed magnetic field is generated which is mutually perpendicular to the longitudinal axis of the meter pipe through which the fluid flows and to the axes of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

The instantaneous voltage developed across the meter electrodes represents the average fluid velocity of the flow profile passing the electrodes at a given moment, and the flowmeter will produce an output signal equal to a continuous average flow rate regardless of whether the flow profile is laminar or turbulent. While it has generally been assumed that a flowmeter output signal is stably and linearly proportional to the volumetric rate of flow through it, experience has shown that this is not strictly true, particularly with low levels of flow rate.

It has been found that at low flow rates, the flowmeter output signal tends to be non-linear, the degree of non-linearity being a function of time and conductivity as well as other factors whose influence is not fully understood. Thus, where the flowmeter is used to measure flow rates within a wide range of values, the accuracy of the meter ceases to be reliable when the velocity of the flow falls below a threshold value.

Accordingly, it is the main object of this invention to provide a magnetic flowmeter whose accuracy is maintained throughout a broad range of flow rate values.

More specifically, it is an object of the invention to provide a flowmeter in which the electromagnetic elements and electrodes are operatively coupled to a cylindrical flow tube which is insertable within a flow pipe, the cylindrical flow tube having a throat section therein which increases the flow velocity in the region of the electrodes, and a diffuser section which thereafter reduces the velocity to that required for full pipe flow without appreciable loss.

A significant advantage of the invention resides in the fact that the percentage of error and hence the departure from linearity decreases as the measured velocity increases. Consequently, by artificially increasing the velocity of flow at the point of measurement, accurate readings may be obtained even for low values of flow rate, and the number of meters needed to cover a given range of flow is thereby reduced.

Also an object of the invention is to provide a flow rate meter which may be readily installed in pipe lines of different size.

Yet another object of the invention is to provide an insert type magnetic flowmeter which is of reliable and accurate operation and is nevertheless of inexpensive design.

Briefly stated, these objects are accomplished in a magnetic flowmeter arrangement adapted to operate in conjunction with a pipe section through which fluid is flowable in a range of values including low flow rates below the level at which a linear response is ordinarily obtainable, the flowmeter comprising a flow tube insertable in said pipe section and attachable thereto, said tube having a constricted throat section serving to increase the velocity of flow therethrough to a level producing a linear response, the throat section being surrounded by electromagnetic means disposed within said pipe to produce a magnetic field perpendicular to the flow direction and electrode axis, electrodes being secured to the throat section to detect the voltage induced in the fluid passing therethrough.

For a better understanding of the invention, as well as other objects and further features thereof, reference is made to the following detailed description to be read in conjunction with the accompanying drawing, wherein:

FIG. 1 is a longitudinal section taken through a magnetic flowmeter having a linear response, in accordance with the invention, the flowmeter being of the flange-mounted type;

FIG. 2 is a perspective view of the flowmeter when removed from the pipe;

FIG. 3 is a front view looking into the flowmeter;

FIG. 4 shows a ring-mounted flowmeter in accordance with the invention; and

FIG. 5 schematically illustrates the operation of the flowmeter.

Referring now to the drawing, and more particularly to FIGS. 1 to 3, the flange-mounted flowmeter in accordance with the invention is constituted by a flow tube generally designated by numeral 10, which is insertable with a tubular pipe section 11 through which the fluid to be measured flows in the direction of the longitudinal pipe axis X.

The flow tube 10 is formed of any suitable nonmagnetic material such as plastic reinforced with fiberglass. If the tube is formed of an electrically conductive material, it is lined with a layer of electrical insulation. A suitable tube material for this purpose is non-magnetic stainless steel, the tube interior being lined with "Kel-F," "Teflon," or "neoprene," or any other substance which will prevent short-circuiting of the voltage induced in the fluid.

One end of the flow tube is provided with an annular mounting flange 12, which as shown in FIG. 1, is adapted to be sandwiched between the end flanges 13 and 14 of flow pipe sections and is bolted thereto to support the flow tube concentrically within the pipe section 11.

The interior of flow tube 10 has a double conical configuration, whereby the cross-sectional diameter, going from the inlet port IP to the outlet port OP, progressively decreases until the middle section of the tube is reached, and thereafter progressively increases. The tube is therefore constituted by an inlet section 15 of decreasing diameter, an outlet section 16 of increasing diameter, and an intermediate junction or throat section 17 which includes the constricted portion of the tube.

A uniform magnetic field is produced in the throat section 17 by means of a pair of coils 18 and 19, disposed on diametrically opposed sides of the throat section. To focus the magnetic field in the direction which is at right angles to the flow fluid, a liminated iron core 20 is disposed about the throat. The electromagnetic arrangement as such is well known, and is disclosed in greater detail in the United States patent to Head, 3,005,342, dated Oct. 24, 1961. The excitation of the coils is preferably with a commercially available 60-cycle alternating voltage, although other frequencies may be used in practice.

Voltage generated by the flow of fluid through the magnetic field is detected by two electrodes 21 and 22 disposed at diametrically opposed positions which are normal to the direction of the magnetic field, as shown diagrammatically in FIG. 5. The electrodes are mounted flush with the interior of the throat section 17 and are gasketed with insulating sleeves, which may be of "Teflon." The electrodes may be made of stainless steel, or for highly corrosive uses, platinum electrodes may be employed.

It is important to note that the rim of the outlet section 16 is concentrically disposed within pipe 11, thereby admitting fluid through an annular passage to the exterior of the flow tube. Thus, the flow tube has fluid pressure both on its inside and outside, and it need not withstand high differential pressures, but only those which will be encountered across the flow device. Since it need not contain the static pressure of the system, it can be of lightweight and inexpensive construction. Thus the insert type flow tube offers great flexibility in installation, for it can be fitted on any existing lines, as long as the flange size of the flow tube can be matched to the pipe flange size.

Since the exterior of the flow tube is accessible to the fluid, and the electromagnets and electrodes are disposed about the throat section, it is necessary to seal these elements from the fluid, and for this purpose the coils and the iron are embedded in epoxy resin or similar protective material. A static shield screen may also be included. Cables for the electrodes and the electromagnetic coils pass out of the pipe through a passage in the epoxy layer on the flange 12.

The operation of the device is based on Faraday's law of electromagnetic induction. Referring to FIG. 5, we shall consider a segment of the metered fluid passing through the throat 17 of the flow tube as a conductor, the length D of which is equal to the diameter of the throat. As the fluid moves transversely at velocity V through a uniform magnetic field B, a voltage E is induced across this section in the plane of the meter electrodes 21 and 22. This voltage is usually proportional to the rate of fluid flow. Expressed mathematically, $$E = \frac{1}{C}BVD$$

where C is a dimensionless constant.

As pointed out previously, for low flow rates, because of time, conductivity, and other error factors, E is not exactly proportional to V. However, inasmuch as the throat 17 forms a constriction in the flow path, it acts to raise the velocity in the region of the electrodes to a level at which the value E is directly proportional to velocity. The outlet section 16 serves as a diffuser to bring the velocity back down to that required for full pipe flow.

The arrangement shown in FIG. 4 is substantially the same as that shown in FIG. 1 except that instead of a flange mounting, the flowmeter tube 10 is provided at either end with rings 24 and 25 which act to center and secure the meter within the pipe. Ring 25 is provided with openings whereby the flow tube exterior is open to process fluid, and the coils and iron are therefore sealed as before.

While there has been shown and described a preferred embodiment of magnetic flowmeter in accordance with the invention, it will be appreciated that many changes and modifications may be made therein without, however, departing from the essential spirit of the invention as defined in the annexed claims.

What I claim is:

1. A magnetic flowmeter which is linear throughout a broad range, comprising,
   (a) a pipe section through which fluid is flowable in a range of values below the level giving rise to a linear flowmeter response,
   (b) a flow tube insertable into the interior of said pipe section, said tube being formed of non-magnetic material and having a relatively constricted throat section serving to increase the velocity of fluid passing therethrough to a level producing a linear response,
   (c) electromagnetic means surrounding said throat section within said pipe section and sealed from said fluid to produce a magnetic field across said throat section perpendicular to the direction of fluid flow in said tube and said electrode axis, and
   (d) a pair of electrodes disposed on diametrically opposed sides of said throat section to detect the voltage induced in said fluid in a direction normal to the direction of said magnetic field.

2. A magnetic flowmeter which is linear throughout a broad range, comprising,
   (a) a pipe section through which fluid is flowable in a range of values below the level giving rise to a linear flowmeter response,
   (b) a flow tube insertable into the interior of said pipe section, said tube being formed of non-magnetic material and having a relatively constricted throat section serving to increase the velocity of fluid passing therethrough to a level producing a linear response, said tube further including a diffuser section coupled to said throat section and of progressively increasing diameter to restore the velocity of said fluid to its original value,
   (c) electromagnetic means surrounding said throat section within said pipe section and sealed from said fluid to produce a magnetic field across said throat section perpendicular to the direction of fluid flow in said tube and the electrode axis, and
   (d) a pair of electrodes disposed on diametrically opposed sides of said throat section to detect the voltage induced in said fluid in a direction normal to the direction of said magnetic field.

3. A magnetic flowmeter, as set forth in claim 2, wherein the interior of said tube has a double-conical configuration, the intermediate section of which constitutes said throat section.

4. A magnetic flowmeter, as set forth in claim 3, wherein the input end of said tube is provided with an annular flange to facilitate attachment to said pipe section.

5. A magnetic flowmeter, as set forth in claim 3, wherein said electromagnetic means is embedded in epoxy resin.

6. A magnetic flowmeter, as set forth in claim 3, wherein said tube is provided at either end with mounting rings to cented and secure said tube within said pipe.

References Cited

UNITED STATES PATENTS

| | | | |
|---|---|---|---|
| 2,733,604 | 2/1956 | Coulter | 73—194 |
| 2,771,771 | 11/1956 | Kamp et al. | 73—194 |
| 2,872,810 | 2/1959 | Shaffer | 73—213 |
| 3,108,474 | 10/1963 | Jun-Ichi Sasaki et al. | 73—194 |

FOREIGN PATENTS 418,349   9/1925   Germany.

RICHARD C. QUEISSER, *Primary Examiner.*

C. A. RUEHL, *Assistant Examiner.*